M. Hatschek.
Making Sulphurous Acid.
Nº 104,011.   Patented Mar. 22, 1870.
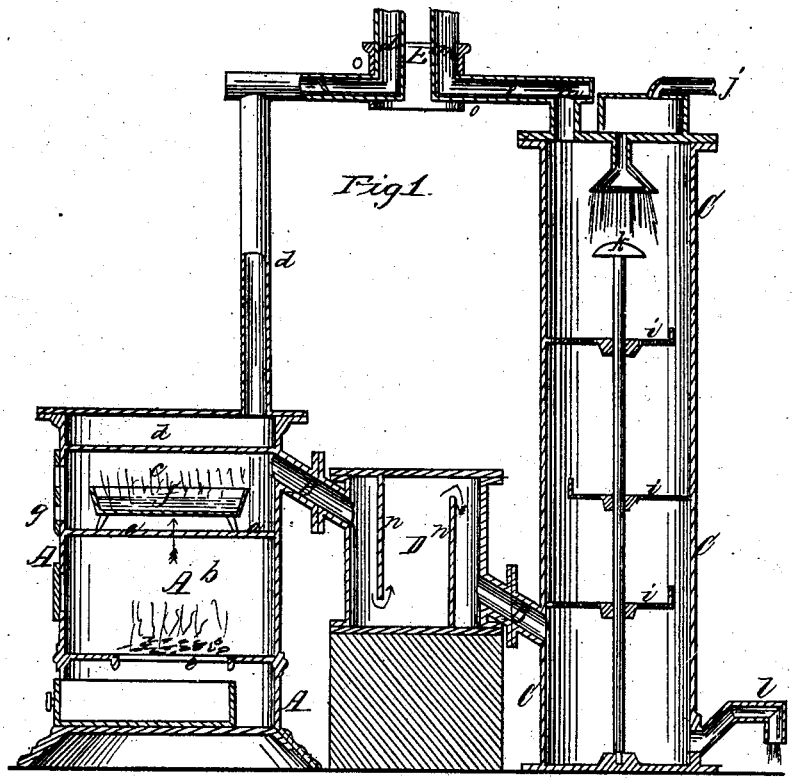
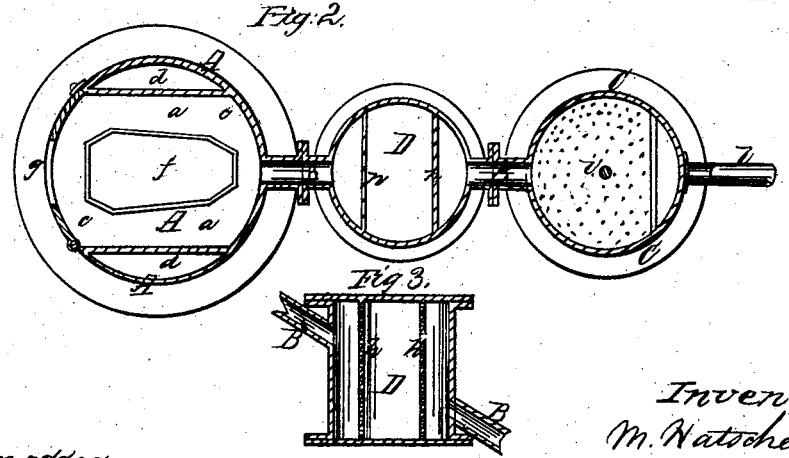
Witnesses,
Jno. Becker
Alex S. Roberts
Inventor
M. Hatschek
By Munn
Attys

United States Patent Office.

MORITZ HATSCHEK, OF PESTH, HUNGARY.

Letters Patent No. 101,011, dated March 22, 1870.

IMPROVED APPARATUS FOR PRODUCING SULPHUROUS ACID.

The Schedule referred to in these Letters Patent and making part of the same

*To all whom it may concern:*

Be it known that I, MORITZ HATSCHEK, of Pesth, Hungary, have invented a new and improved Apparatus for Producing Dissolved Sulphurous Acid; and I do hereby declare that the following is a full, clear, and exact description thereof, which will enable others skilled in the art to make and use the same, reference being had to the accompanying drawings forming part of this specification, in which—

Figure 1 represents a vertical longitudinal section of my improved apparatus.

Figure 2 is a horizontal section of the same.

Figure 3 is a detail vertical section of the detaining chamber, showing a modified construction.

Similar letters of reference indicate corresponding parts.

This invention has for its object to provide an apparatus by which a solution of sulphurous acid ($SO^2+HO$) may be readily produced, such acid being used for distilling and brewing, and for other useful purposes.

The invention consists in the arrangement and construction of a furnace in which the sulphur is burned and a current of air brought to it, and of a detaining-chamber and combining-column, the latter receiving the water at the upper end and spreading it into a fine spray, in which state it is most apt to take up the sulphur and the oxygen of the air, while the nitrogen passes off as useless for this purpose.

A in the drawing represents the oven or furnace. The same contains a horizontal partition, $a$, which divides the fire-chamber $b$ from the upper melting-chamber $c$. The smoke-flues $d$ $d$ from the fire-chamber embrace the melting-chamber so as to thoroughly heat the same.

In the fire-chamber is a grate, $e$, on which wood or other suitable fuel can be consumed.

The sulphur to be evaporated is, in bars or other form, placed into a pan, $f$, in the melting-chamber, and is soon liquefied by the heat and then ignited.

Atmospheric air is constantly brought to the burning sulphur through an opening, $g$, in the furnace.

By a pipe, B, the sulphurous vapor, combined with the air, is carried to the combining-column C.

In the pipe B is arranged a detaining-box, D, which has several vertical plates, $n$, by which any solid or non-vaporous substance carried along by the vapors will be arrested. Instead of the plates $n$, perforated partitions $h$, as in fig. 3, or filters, may be employed.

The column C is a vertical cylinder, made of sheet metal or other suitable material, and provided with three, or more or less, horizontal plates $i$ $i$ or sieves. Water is, through a pipe, $j$, carried into the upper end of the column, and flows first upon a block, $k$, held in said column. By this block the water is spread and thrown in a fine spray upon the sieves $i$, through which it trickles in very fine drops, being detained as it descends by such sieves. While the water passes down it absorbs from the vapors that enter the column through the pipe B everything but the nitrogen, which passes up in the column, and thence into the same chimney E in which the smoke is carried off. The sulphurous water falls to the bottom of the column, and can be drawn off through a pipe, $l$.

In order to facilitate the escape of the nitrogen, and also a perfect draught in the melting-chamber and pipe B, I have surrounded the two parts $d$ $m$ of the chimney with a sleeve, $o$, of some bad heat-conducting material. Thereby the air passing through the part $m$ will become heated by the escaping smoke, and will, consequently, escape rapidly.

Having thus described my invention,

I claim as new and desire to secure by Letters Patent—

1. Producing a solution of sulphurous acid by injecting upon the ascending fumes of sulphur a descending stream of watery spray, to combine with and condense the same in the manner described.

2. The arrangement of the retarding-box D, combining-column C, water-spreader K, and inlet-pipe $j$, as and for the purpose specified.

3. The method of making dilute sulphurous acid by passing a current of air across the pan $f$, carrying the product thus formed through the detaining-box D, then up through a column, C, and against the descending watery spray, in the manner set forth.

MORITZ HATSCHEK.

Witnesses:
OTTO KÄH,
KARL RÖSSLER.